United States Patent
Shechtman et al.

(10) Patent No.: US 9,881,376 B2
(45) Date of Patent: Jan. 30, 2018

(54) CONTENT AWARE SLIDESHOWS

(71) Applicant: Adobe Systems Incorporated, San Jose, CA (US)

(72) Inventors: Elya Shechtman, Seattle, WA (US); Shai Bagon, Rehovot (IL); Aseem O. Agarwala, Seattle, WA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 687 days.

(21) Appl. No.: 14/444,996

(22) Filed: Jul. 28, 2014

(65) Prior Publication Data
US 2014/0337721 A1 Nov. 13, 2014

Related U.S. Application Data

(63) Continuation of application No. 12/324,345, filed on Nov. 26, 2008, now Pat. No. 8,811,771.
(Continued)

(51) Int. Cl.
*G06F 17/00* (2006.01)
*G06T 7/00* (2017.01)
(Continued)

(52) U.S. Cl.
CPC ........ *G06T 7/0038* (2013.01); *G06K 9/00718* (2013.01); *G06T 3/0006* (2013.01);
(Continued)

(58) Field of Classification Search
CPC ... G06K 9/00718; G06T 13/80; G06T 3/0006; G06T 3/0056; G06T 7/0038; G06T 7/38; G06T 2207/20036
(Continued)

(56) References Cited

U.S. PATENT DOCUMENTS 5,600,731 A 2/1997 Sezan et al.
5,635,982 A 6/1997 Zhang et al.
(Continued)

FOREIGN PATENT DOCUMENTS

JP 2003109009 4/2003
JP 2004336566 11/2004

OTHER PUBLICATIONS

Chen et al., ,"Tiling Slideshows" ACM, p. 25-34, published in Oct. 23-27, 2006.*
(Continued)

*Primary Examiner* — Mekonen Bekele
(74) *Attorney, Agent, or Firm* — Wolfe-SBMC

(57) ABSTRACT

A method, system, and computer-readable storage medium for performing content based transitions between images. Image content within each image of a set of images are analyzed to determine at least one respective characteristic metric for each image. A respective transition score for each pair of at least a subset of the images is determined with respect to each transition effect of a plurality of transition effects based on the at least one respective characteristic metric for each image. Transition effects implementing transitions between successive images for a sequence of the images are determined based on the transition scores. An indication of the determined transition effects is stored. The determined transition effects are useable to present the images in a slideshow or other image sequence presentation.

20 Claims, 9 Drawing Sheets

Related U.S. Application Data

(60) Provisional application No. 61/091,228, filed on Aug. 22, 2008.

(51) Int. Cl.
  G06T 13/80 (2011.01)
  G06K 9/00 (2006.01)
  G06T 3/00 (2006.01)
  G06T 7/38 (2017.01)

(52) U.S. Cl.
  CPC .............. G06T 3/0056 (2013.01); G06T 7/38 (2017.01); G06T 13/80 (2013.01); *G06T 2207/20036* (2013.01)

(58) Field of Classification Search
  USPC ....... 382/284, 236, 243, 268, 266, 235, 173, 382/165, 103, 190, 100, 180, 195
  See application file for complete search history.

(56) References Cited

U.S. PATENT DOCUMENTS

| | | | | |
|---|---|---|---|---|
| 5,689,585 | A * | 11/1997 | Bloomberg | G06K 9/00469 382/229 |
| 6,026,195 | A | 2/2000 | Eifrig et al. | |
| 6,342,904 | B1 * | 1/2002 | Vasudevan | H04N 19/587 375/E7.253 |
| 6,587,156 | B1 | 7/2003 | Stubler | |
| 6,711,293 | B1 | 3/2004 | Lowe | |
| RE38,564 | E | 8/2004 | Eifrig et al. | |
| 7,075,683 | B1 * | 7/2006 | Shiiyama | G06F 17/30843 348/700 |
| 8,811,771 | B2 | 8/2014 | Shechtman et al. | |
| 2003/0198402 | A1 * | 10/2003 | Zhang | G06T 15/04 382/276 |
| 2006/0204055 | A1 * | 9/2006 | Steinberg | H04N 5/23212 382/118 |
| 2006/0285724 | A1 | 12/2006 | Tian | |
| 2008/0019610 | A1 * | 1/2008 | Matsuzaka | G06K 9/00711 382/284 |
| 2008/0074489 | A1 * | 3/2008 | Zhang | G06T 3/4038 348/36 |
| 2008/0086688 | A1 | 4/2008 | Chandratillake et al. | |
| 2008/0181492 | A1 * | 7/2008 | Abe | H04N 19/14 382/165 |
| 2008/0239159 | A1 | 10/2008 | Read et al. | |
| 2008/0310727 | A1 | 12/2008 | Wu et al. | |
| 2009/0052783 | A1 * | 2/2009 | Aoki | G06F 17/30793 382/209 |
| 2012/0229694 | A1 * | 9/2012 | Steinberg | H04N 5/23212 348/352 |
| 2013/0124951 | A1 | 5/2013 | Shechtman | |
| 2013/0156264 | A1 * | 6/2013 | Martensson | G06T 7/0075 382/103 |

OTHER PUBLICATIONS

"Final Office Action", U.S. Appl. No. 12/324,345, dated Apr. 8, 2013, 22 pages.
"Non-Final Office Action", U.S. Appl. No. 12/324,345, dated Nov. 5, 2013, 18 pages.
"Non-Final Office Action", U.S. Appl. No. 12/324,345, dated Mar. 15, 2012, 21 pages.
"Non-Final Office Action", U.S. Appl. No. 12/324,345, dated Sep. 27, 2012, 19 pages.
"Notice of Allowance", U.S. Appl. No. 12/324,345, dated Apr. 10, 2014, 7 pages.
Chen, et al., "Tiling Slideshow", In Proceedings of MM 2006, Oct. 23, 2006, pp. 25-34.
Lazebnik, et al., "Beyond Bags of Features: Spatial Pyramid Matching for Recognizing Natural Scene Categories", CVPR, Jun. 2006, 8 pages.
Lowe, "Distinctive Image Features from Scale-Invariant Keypoints", International Journal of Computer Vision, Available at <http://www.cs.ubc.ca/~lowe/papers/ijc04.pdf>,Jan. 5, 2004, pp. 1-28.
Nister, et al., "Scalable Recognition with a Vocabulary Tree", CVPR, 2006, 8 pages.
Philbin, et al., "Object Retrieval with Large Vocabularies and Fast Spatial Matching", CVPR, 2007, 8 pages.
Snavely, et al., "Photo Tourism: Exploring Photo Collections in 3D", International Conference on Computer Graphics and Interactive Techniques, Available at <http://phototour.cs.washington.edu/Photo_Tourism.pdf>,Jul. 2006, 12 pages.
Torralba, et al., "Context-based Vision System for Place and Object Recognition", IEEE International Conference on Computer Vision (ICCV), Nice, France, Oct. 2003, 8 pages.

* cited by examiner

CONTENT AWARE SLIDESHOWS

PRIORITY DATA

This application is a continuation of and claims priority to U.S. application Ser. No. 12/324,345, filed Nov. 26, 2008, which claims benefit of priority to U.S. Provisional Application Ser. No. 61/091,228 titled "Content Aware Slideshows", filed Aug. 22, 2008. These disclosures are incorporated by reference herein in their entirety.

BACKGROUND

Field of the Invention

The present invention is directed to image presentation; and more particularly to content based transitions between images, e.g., for automatic ordering of and transitioning between images in a digital image slideshow.

Description of the Related Art

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Digital image processing is the process of analyzing and/or modifying digital images using a computing device, e.g., a computer system. Using specialized software programs, digital images may be manipulated and transformed in a variety of ways.

An image slideshow is a very popular tool for presenting private and other image collections as a presentation or screensaver on computer systems, digital photo frames, in documentary movies, etc. Common (prior art) slideshows use arbitrary transition effects between images, such as cross-fade and dissolving, and the presentation order is generally chronological, random, or user defined. However, the repetitive and predictable use of a transition effect, and the ordering of images in either a random or a predictable manner, generally become boring to viewers, and tend to be lacking in aesthetic appeal.

SUMMARY

Various embodiments of systems, methods, and computer-readable storage media for performing content based transitions between images are presented.

Image content within each image of a set of images may be analyzed to determine at least one respective characteristic metric for each image. For example, in one embodiment, the method may include analyzing content metadata from each image, such as, for example, a depth and geometric content map, image segmentation, an edge map, faces (or other objects) color distribution, feature points, a global descriptor, or a saliency map, among others, where the at least one respective characteristic metric for each image may be determined at least in part based on the content metadata. Note that this analysis may be performed in any of a variety of ways, and via any available tools or products, e.g., possibly "off the shelf" applications, plugins, and/or custom software, as desired. Thus, for each image, one or more characteristic metrics may be determined based on the content of the image. These metrics may then be stored, e.g., in a computer-readable storage medium. Specific examples of such analysis are described herein. Note that as used herein, the term "metric" refers to a "measure" with respect to some attribute or quality, and is not limited to the formal mathematical/geometric meaning.

In one embodiment, the method may further include automatically extracting the content metadata from each image of at least a subset of the images. However, it should be noted that in various embodiments, the content metadata may be extracted manually, automatically, or both.

In some embodiment, a saliency map may be determined or computed for each imago of at least a subset of the images, where the saliency map may be used to determine or implement various transition effects, e.g., to select a camera motion path, e.g., to optimize a camera motion path with respect to interesting portions of an image, e.g., detected faces, complex features, determine regions of interest, etc. Such camera paths may be used, for example, in cases where the transition effect requires panning over the image, e.g., to arrive at a portion or object in the image that serves as an anchor or a region or feature of interest for the transition. The saliency map may also be used to determine or implement various other transition effects, e.g., as will be described below. As used herein, "camera" refers to "field of view", and does not imply use of a physical camera. In other words, this term refers to the viewpoint giving rise to how the image is presented, including, for example, view position, view distance, view orientation, and so forth. Thus, a camera motion path refers to a field of view path that results in presentation of the image to the viewer in accordance with an analogous camera motion.

A respective transition score may be determined for each pair of at least a subset of the images with respect to each transition effect of a plurality of transition effects based on the at least one respective characteristic metric for each image, where the respective transition effect may be useable to implement a transition between the pair of images. In one embodiment, determining the respective transition effect may include determining a region in each image of the pair to which the respective transition. Note that each transition effect may include one or more image operations implementing or facilitating the transition effect, as will be described below in more detail. The transition effects and image operations contemplated may include, but are not limited to, cross fades (uniform and/or non-uniform), dissolves, morphs, match cuts, zooms, rotations, and pans, among others, as will also be described in more detail below. For example, panning and zooming effects/operations may be used to draw attention to an interesting region of an image, e.g., to set up an image for another transition effect, e.g., to move to a region that is going to be cross-faded (e.g., in the object/faces, large segment and long lines/edges effects), for seamlessly replacing other image regions, and so forth, as desired. Thus, a transition effect may utilize one or more image operations to implement a transition from a first image to a second image.

The suitability of each transition effect may be dependent upon the characteristics of the images, and more specifically, upon the characteristics of pairs of images. This suitability may be represented or quantified by the transition scores, which in preferred embodiments may be normalized, e.g., to a value between zero and 1, where a value of 1 may indicate maximum suitability of a particular transition effect or technique for a pair of images, and where a value of zero may indicate minimum suitability. Of course, any other value range may be used as desired. Such normalization may facilitate the comparison of candidate transition effects/image pairs to determine a "best" set of transition effects/image pairs for sequencing the images.

Thus, a score may be determined for each pair of images and for each transition effect that reflects the suitability, appropriateness, or "goodness" of the transition effect for transitioning between the images. For example, the similarity of colors of large segments (regions) in two images may indicate the suitability of a zoom/pan transition effect based on zooming into a segment (color field) in one image, cross fading to a similarly colored segment (zoomed in) in a second image, then zooming back out.

Transition effects for performing transitions between successive images may then be determined for a sequence of the images based on the transition scores. There are many different ways in which these transition effects for transitioning between successive images may be determined. For example, in some embodiment, the transitions scores for each transition effect may be computed for every possible pairing of the images, i.e., in an exhaustive manner. These transition scores may compose a matrix, e.g., an "affinity" or "similarity" matrix, which encodes the collective similarities among image pairs, although any other data structure or arrangement may be used as desired. For example, in one exemplary embodiment, an affinity or similarity matrix may be constructed for each transition effect (or for each image pair), while in other embodiments a single high-dimensional matrix may be constructed for all the considered image pairs with respect to all available transition effects. The matrix or matrices may then be analyzed to determine a sequence of images with corresponding transition effects implementing or facilitating transitions between the images, e.g., that maximizes or optimizes the similarities or "affinity" of the sequence. As used herein, the term "sequence" may be used to refer to a sequence of images plus the transition effects for transitioning between successive pairs in the sequence.

All indication of the determined transition effects may be stored, e.g., in a computer-readable storage medium. The determined transition effects may be useable to display an image sequence. For example, in some embodiments, a sequence of the images may be determined or produced based on the determined transition effects. The sequence may thus include the images ordered in accordance with the determined transition effects. In some embodiments, an indication of the sequence of images (and transition effects) may be stored, e.g., in a computer-readable storage medium (e.g., a memory medium of the computer system), and may be subsequently presented or displayed, e.g., as a slide show. In other words, the image sequence may be presented, with the determined transitions, on a display, e.g., of a computer, digital picture frame, or other digital display device. Said another way, the determined sequence (including transition effects), or an indication thereof, may be stored and used to present the images with transitions using the determined transition effects, e.g., in a slideshow. Note that storing the sequence may include storing all components of the sequence, e.g., as a slide-show data file, or may only involve storing information specifying the sequence and transition effects, e.g., with pointers (or other indicators) to any components to be used to make the presentation.

Thus, embodiments of the systems and methods disclosed herein may implement of facilitate content based transitions between images, e.g., for automatic ordering of and transitioning between images in a digital image sequence.

Figure 1:
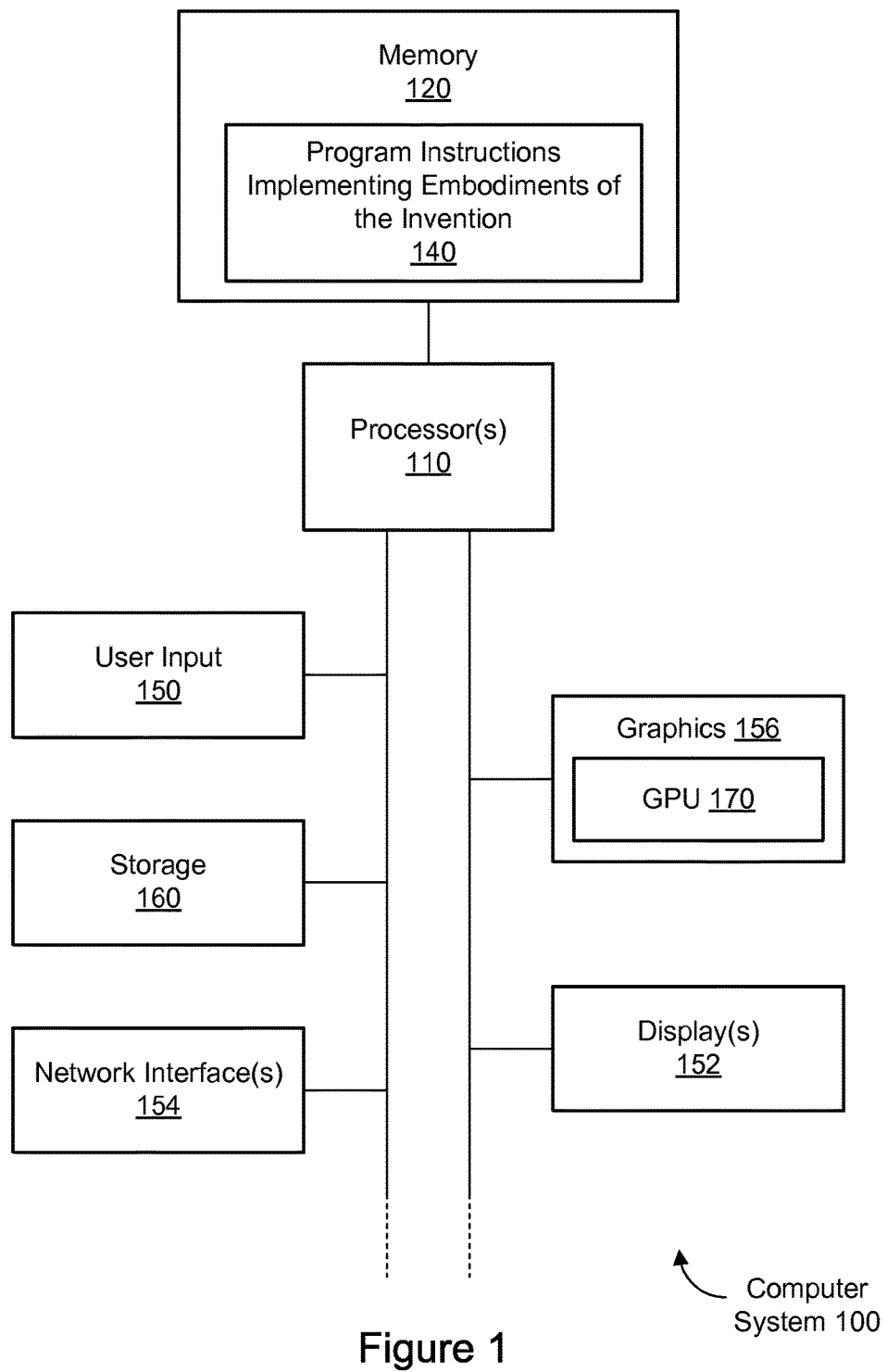
FIG. 1 is a block diagram of an exemplary system configured to implement embodiments of the present invention.

While the invention is susceptible to various modifications and alternative forms, specific embodiments are shown by way of example in the drawings, and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Embodiments of the systems and methods described herein may be used to automatically transition between images based on content, e.g., to create and present content aware slideshows. More specifically, embodiments of the systems and methods disclosed herein may be used to analyze a set of images based on image content to determine characteristic metadata for the images, assess the suitability of pairs of these images for various different transition techniques or effects, and determine transition effects to implement transitions between the images based on affinities or similarities among the images. Additionally, a sequence of the images may be ordered in accordance with the determined transition effects, e.g., for a content based slideshow. Such a combination of ordering and transition effects may enhance the aesthetic appeal of slideshows.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this contest, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the contest of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphic card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Figure 2:
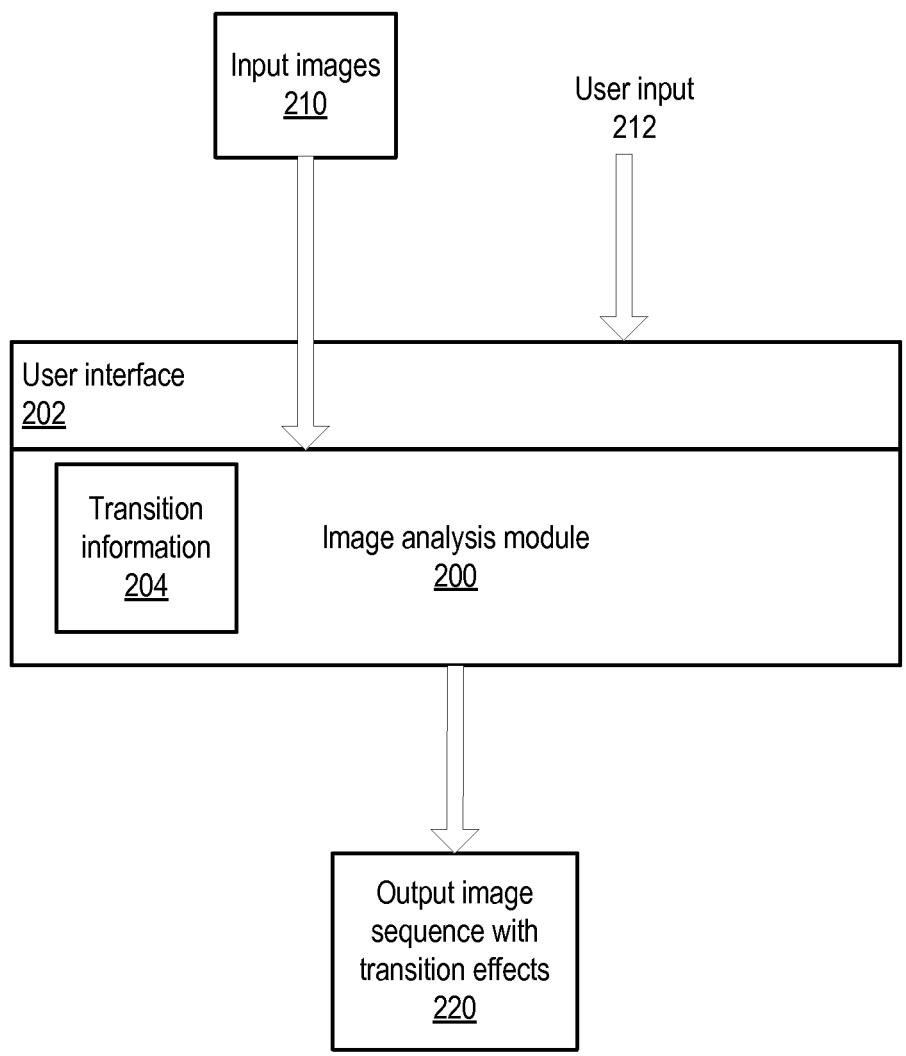
FIG. 2 illustrates an exemplary image analysis module, according to one embodiment.

FIG. 2 illustrates an exemplary image analysis module that may implement embodiments of a method for content based transitioning among images, as described below with reference to FIG. 3. In one embodiment, module 200 may provide a user interface 202 that includes one or more user interface elements via which a user may initiate, interact with, direct, and/or control the method performed by module 200. Module 200 may obtain a set of images 210 and, optionally, user input 212, and determine transition effects for the images accordingly as described herein to specify and optionally generate a sequence of images with transition effects 220 from the input images 210. Transition information 204, e.g., information specifying or facilitating various transition effects or algorithms, and may be used to perform the image analysis. The transition information may include information regarding any types of transition effects and image operations desired, including, but not limited to, for example, cross fades, dissolves, morphs, etc., commonly used in digital slide shows, as well as transition effects and image operations used in cinematography, such as match cuts, pairs, and zooms, among others.

Image analysis module 200 may be implemented as or in a stand-alone application or as a module of or plug-in for an image presentation application. Examples of types of applications in which embodiments of module 200 may be implemented may include, but are not limited to, image presentation applications, such as screensavers, computer photo albums, and digital photo frames, etc., as well as applications in educational, scientific, medical, publishing, digital photography, video editing, games, animation, marketing, and/or other applications in which digital image presentation may be performed. Specific examples of applications in which embodiments may be implemented include, but are not limited to, Adobe® Photoshop®, Adobe® Photoshop Express®, and Adobe® Lightroom®, among others.

In addition to generating an output image sequence 220, module 200 may be used to display, manipulate, modify, and/or store the output images for example to a computer-readable memory medium such as a storage device or storage medium.

Overview

In one embodiment image content within each image of a set of images may be analyzed to determine at least one respective characteristic metric for each image, and a respective transition determined for each of a plurality of pairs of the images based on the at least one respective characteristic metric for each image, which may include determining a region in each image of the pair to which the respective transition will be applied.

Figure 3:
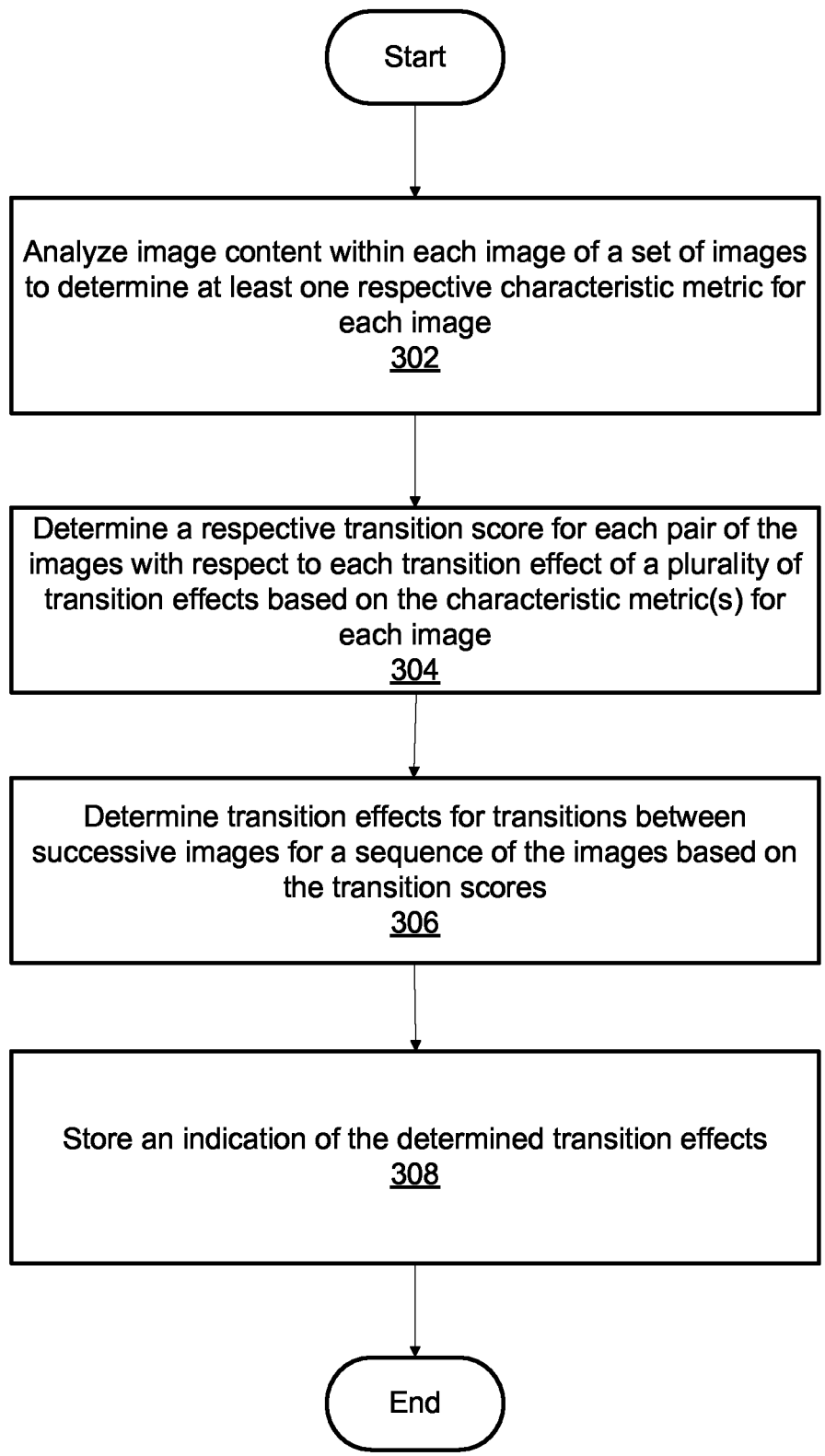
FIG. 3 is a flowchart illustrating a method for performing content based transitions between images, according to one embodiment.

FIG. 3 is a flowchart illustrating a method for content-based transitions among images. The method shown in FIG. 3 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 302, image content within each image of a set of images may be analyzed to determine at least one respective characteristic metric for each image. For example, in one embodiment, the method may include analyzing content metadata from each image, such as, for example, a depth and geometric contest map, image segmentation, an edge map, faces (or other objects), color distribution, feature points, a global descriptor, or a saliency map, among others, where the at least one respective characteristic metric for each image may be determined at least in part based on the content metadata. Geometric contest refers to descriptive information regarding geometric features in the image, e.g., information such as "horizontal plane", "vertical plane", "sky", and so forth.

Note that this analysis may be performed in any of a variety of ways, and via any available tools or products, e.g., possibly "off the shelf" applications, plugins, and/or custom software, as desired. Thus, for each image, one or more characteristic metrics may be determined based on the content of the image. These metrics may be stored, e.g., in a computer-readable storage medium. Specific examples of such analysis are provided below. Note that as used herein, the term "metric" refers to a "measure" with respect to some attribute or quality, and is not limited to the formal mathematical/geometric meaning.

In one embodiment, the method may further include automatically extracting the content metadata from each image of at least a subset of the images. However, it should be noted that in various embodiments, the content metadata may be extracted manually, automatically, or both.

In some embodiments, a saliency map may be determined or computed for each image of at least a subset of the images, where the saliency map may be used to determine or implement various transition effects, e.g., to select a camera motion path, e.g., to optimize a camera motion path with respect to interesting portions of an image, e.g., detected faces, complex features, determine regions of interest, etc. Such camera paths may be used, for example, in cases where the transition effect requires panning over the image, e.g., to arrive at a portion or object in the image that serves as an anchor or a region or feature of interest for the transition. The saliency map may also be used to determine or implement various other transition effects, e.g., as will be described below.

It should be noted that as used herein, "camera" refers to "field of view", and does not imply use of a physical camera. In other words, this term refers to the viewpoint giving rise to how the image is presented, including, for example, view position, view distance, view orientation, and so forth. Thus, a camera motion path refers to a field of view path that results in presentation of the image to the viewer in accordance with an analogous camera motion.

In some embodiments, the metadata may be updated when images are added (or removed) from the set, possibly automatically. For example, the method may include receiving user input, e.g., to the GUI of the module of FIG. 2, adding or removing an image from the set of images specified for the presentation, or, in an embodiment where the update is automatic, the method may include monitoring a directory or computer file folder for changes in the content of the directory or folder, i.e., addition or removal of an image. In response to the addition or removal of an image (or images), the method may include analyzing and determining metadata for any new images, and/or deleting metadata related to any removed images.

In 304, a respective transition score may be determined for each pair of at least a subset of the images with respect to each transition effect of a plurality of transition effects based or the at least one respective characteristic metric for each image, where the respective transition effect may be useable to implement a transition between the pair of images. In one embodiment, determining the respective transition effect may include determining a region in each image of the pair to which the respective transition effect will be applied, as will be discussed below in more detail.

Note that each transition effect may include one or more image operations implementing or facilitating the transition effect, as will be described below in more detail. As mentioned above with reference to FIG. 2, the transition effects and image operations contemplated may include, but are not limited to, cross fades (uniform and/or non-uniform), dissolves, morphs, match cuts, zooms, rotations, and pairs, among others, as will also be described in more detail below. For example, panning and zooming effects/operations may be used to draw attention to an interesting region of an image, e.g., to set up an image for another transition effect, e.g., to move to a region that is going to be cross-faded (e.g., in the object/faces, large segment and long lines/edges effects), for seamlessly replacing other image regions, and so forth, as desired. Thus, a transition effect may utilize one or more image operations to implement a transition from a first image to a second image.

The suitability of each transition effect may be dependent upon the characteristics of the images, and more specifically, upon the characteristics of pairs of images. This suitability may be represented or quantified by the transition scams, which in preferred embodiments may be normalized, e.g., to a value between zero and 1, where a value of 1 may indicate maximum suitability of a particular transition effect or technique for a pair of images, and where a value of zero may indicate minimum suitability. Of course, any other value range may be used as desired. Such normalization may facilitate the comparison of candidate transition effects/image pairs to determine a "best" set of transition effects/image pairs for sequencing the images.

Thus, a score may be determined for each pair of images and for each transition effect that reflects the suitability, appropriateness, or "goodness", of the transition effect for transitioning between the images. For example, the similarity of colors of large segments (regions) in two images may indicate the suitability of a zoom/pan transition effect based on looming into a segment (color field) in one image, cross fading to a similarly colored segment (zoomed in) in a second image, then zooming back out. As another example, the similarity of respective faces in two images may indicate the suitability of a face-based transition effect, as will be describe in more detail below.

In 306, transition effects for performing transitions between successive images may be determined for a sequence of the images based on the transition scores. There are many different ways in which these transition effects for transitioning between successive images may be determined. For example, in some embodiments, the transitions scores for each transition effect (in 304 above) may be computed for every possible pairing of the images, i.e., in an exhaustive manner. These transition scores may compose a matrix, e.g., an "affinity" or "similarity" matrix, which encodes the collective similarities among image pairs, although any other data structure or arrangement may be used as desired. For example, in one exemplary embodiment, an affinity or similarity matrix may be constructed for each transition effect (or for each image pair), while in other embodiments a single high-dimensional matrix may be constructed for all the considered image pairs with respect to all available transition effects. The matrix or matrices may then be analyzed to determine a sequence of images with corresponding transition effects implementing or facilitating transitions between the images, e.g., that maximizes or optimizes the similarities or "affinity" of the sequence. As used herein, the term "sequence" may be used to refer to a sequence of images plus the transition effects for transitioning between successive pairs in the sequence.

In 308, an indication of the determined transition effects may be stored, e.g., in a computer-readable storage medium. The determined transition effects may be useable to display an image sequence. For example, as mentioned above, in some embodiments, a sequence of images may be determined or produced based on the determined transition effects. The sequence may thus include the images ordered in accordance with the determined transition effects. In some embodiments, an indication of the sequence of images (and transition effects) may be stored, e.g., in a computer-readable storage medium (e.g., a memory medium of the computer system), and may be subsequently presented or displayed, e.g., as a slide show. In other words, the image sequence may be presented, with the determined transitions, on a display, e.g., of a computer, digital picture frame, or other digital display device. Said another way, the determined sequence (including transition effects), or an indication thereof may be stored and used to present the images with transitions using the determined transition effects, e.g., in a slideshow. Note that storing the sequence may include storing all components of the sequence, e.g., as a slide-show data file, or may only involve storing information specifying the sequence and transition effects, e.g., with pointers (or other indicators) to any components to be used to make the presentation.

In some embodiments, determining transition effects for transitions between successive images for a sequence of the images based on the transition scores may include solving an optimization problem to determine a solution that substantially maximizes similarity over the sequence of images, i.e., over the entire sequence. In other words, an optimization problem may be formulated and solved, e.g., by a solver e.g., an optimizer or other solution means, where the solver attempts to determine an optimal trajectory or path through the images that maximizes similarity over the trajectory or path, thus producing a substantially optimum sequence. Note that as used herein, "substantially optimum" refers to a solution at or near the theoretical optimum, i.e., within tolerance or epsilon of the mathematical optimum solution. In other words, the solution need not be the absolute best solution to a technical sense. Thus, for example, in one exemplary embodiment, the solution (sequence) may be within 10% of the optimal solution. In other exemplary embodiments, the solution (sequence) may be within 20%, 15%, 10%, 5%, 3%, 1% (or within any other specified percentage) of the optimal solution, and so forth, as desired. Said another way, based on the application, the determined solution may be optimal within some specified tolerance.

In some embodiments, the transition effects for transitions between successive images for a sequence of the images may be determined subject to one or more constraints. For example, in one embodiment, a user (or a default configuration) may specify priorities or preferences regarding transition effects available for use, and/or optionally, with respect to image attributes. As another example, a constraint may be specified regarding repetition or frequency of transition effects or image attributes, e.g., a constraint that specifies that no transition effect may be used more than N times in a row, or more than X % of the transition, e.g., with respect to a moving window of M transitions. As yet another example, a constraint may specify distribution of image content, e.g., that images that include faces be distributed throughout the sequence, e.g., may not occur in clusters, or, alternatively, should occur in clusters. Such constraints or preferences may be specified via any of various means, e.g., a configuration file, via the user interface 202 of FIG. 2, etc., as desired.

In one embodiment, these constraints or preferences may be used to weight the transition scores, and/or may be imposed on the determination process, e.g., as constraints in an optimization problem, which may be solved by a suitable solver e.g., an off the shelf optimizer. For example, in one exemplary embodiment, an objective function may be specified that maximizes the affinity or similarity of the sequence of images (including the transitions), where the objective function may be solved subject to the specified constraints. In another exemplary embodiment, the determination may be made as an approximate solution to the traveling salesman problem, where the (transition dependent) affinities or similarities correspond to distances in the problem, for example, using Dijkstra's shortest path algorithm.

In yet another embodiment, the determination may be made by solving a dynamic programming problem for a feed length sequence. For example, in one embodiment of this approach, rather than computing transition scores for all possible image pairings (per transition effect), the method may include picking an initial image, e.g., at random, or in response to user input, and analyzing candidate transitions between this image and each of the other images in the set. The transition and transition target (the next image) may be selected based on the relevant transition scores, after which the initial image may be removed from consideration. Then, the second image may be paired with (analyzed with respect to) each remaining image in the set in a similar manner, and so forth. Thus, using this approach the transitions scores need only be computed for a subset of the possible image pairs, which may significantly improve performance of the method.

Thus, a substantially optimal sequence may be determined using any of a wide variety of techniques. As noted above, in some embodiments, each transition effect may include one or more image operations implementing or facilitating the transition effect, and so the method may also include determining one or more image operations, e.g., image movement operations, for each of the determined transition effects, e.g., to facilitate or implement the transition, e.g., camera motion paths, zooms, local cross-fades, synthesized boundary regions, segmentation, i.e., separating the foreground from background, etc. For example, in one embodiment, heuristics may be determined for generating smooth camera motion paths and zooms for the various transitions.

As noted above, in some embodiments, a saliency map may be determined for at least some of the images whereby regions of interest, e.g., of high detail or structure, may be determined. In some embodiments, determining a respective transition effect may include determining an optimal camera motion path based on one or more of: a saliency map for each image of the pair of images, locations of similar regions or objects in the pair of images, depth information for the pair of images, and/or one or more constraints regarding path smoothness and/or camera velocity at one or more points in the pair of images. Thus, for example a transition effect may include zooming in on a region of interest in a first image, fading to a region of interest in a second image, e.g., a region with similar attributes, and zooming out to show the entire second image. As another example, a camera path may be determined that pans/zooms to a region of interest in a first image, transitions to a region of interest in a second image, then pans/zooms out to show the second image, where, for example, the camera may slow down as it approaches the region of interest in the first image, then speed up as it leaves the region of interest in the second image.

As mentioned above, determining one or more image operations may include determining one or more of: camera motion path (e.g., by solving an optimization problem), zoom, rotation, morph, cross-fade, or synthesis of a boundary or transition region, e.g., for depth discontinuity and panoramic stitching effects, among others. In some embodiments, these image operations may be computed online for a specific sequence that was defined automatically or manually. Note that a cross-fade may be uniform, cross-fade, e.g., where one image (region) uniformly fades into another, or may be a non-uniform cross-fade, for example, first fading an face/object and then the rest of the region from the center outwards, or fading edge pixels first and then fading from the edge outwards.

In further embodiments, these operations (and others) may be determined more rigorously, e.g., using an optimization framework. For example, an optimization objective function for a specific image movement operation may be determined based on a parametric model (such as splines) of image attributes such as field of view center, size, and orientation (or the four frame corners), and transition specific constraints (constraints on locations that should be passed within the two images, desired velocities at specified points, maximizing the saliency score along the path, avoiding showing some regions, etc.), as well as general constraints on the camera motion inspired by cinematographic rules.

In some embodiments, a first portion of the method may be performed in a preprocessing step, e.g., "offline". In other words, in one embodiment, analyzing image content may performed as a pre-process in which the analyzing is performed for all of the images of the set of images prior to performing the determining a respective transition effect for any of the plurality of pairs of the images. Thus for example, a database of images may be maintained, where updating the database with one or more images may include analyzing the image content of the new images to determine (and store) image metadata for the new images. In some embodiments, a second portion of the method may be performed "online", i.e., as an online step, e.g., when an application for determining the transition effects, and possibly for implementing the image sequencing, is executed. Said another way, the determining a respective transition for each pair of a plurality of pairs of the images may be performed in response to input, in response to receiving one or more new images to a database, or possibly in response to invoking display of an image sequence, among others.

Figure 4:
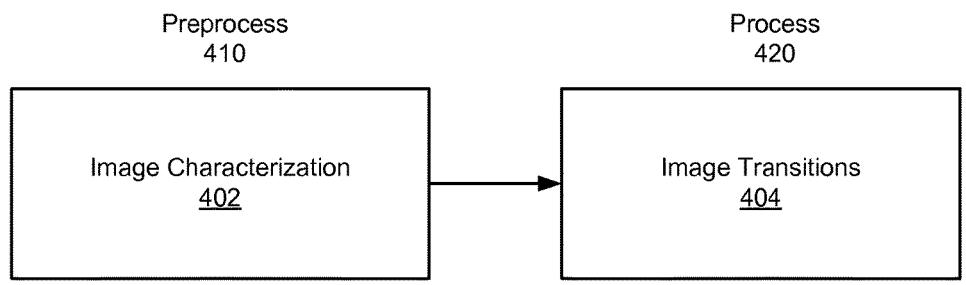
FIG. 4 illustrates a preprocess/process partition of the method of FIG. 3, according to one embodiment.

FIG. 4 illustrates one embodiment of such an approach. As may be seen, in this embodiment, image characterization 402 is performed in a preprocess 410, while the particular image transitions 404 for the sequence of images are determined as part of a subsequent process 420. Thus, for example, in one embodiment, method element 302, in which characteristic metadata are determined for the images, may be performed as preprocess 402, while method elements 304 and 306 may be performed as part of process 420. In other embodiments, the method may be partitioned in any of various other ways, e.g., method elements 302 and 304 may be performed as preprocess 402, while method element 306 may be performed as part of process 420, among other partitioning schemes.

For example, in some embodiments, the preprocess 410 may be performed as part of an initialization routine upon provision of the images to an application, and the process 420 may be performed upon invocation of a presentation of the images, e.g., in a slideshow. In another embodiment, the sequence of images (including transitions) may be determined entirely in the preprocess 410, and the process 420 may only involve the actual presentation of the sequence, e.g., in a slideshow. Any other partitions may be used as desired.

In another type of partitioning, one or more of the method elements may be performed in or by a first one or more execution threads, i.e., by a first process, while others of the method elements may be performed in or by a second one or more execution threads, different from the first one or more execution threads, e.g., on respective processors, possibly on difference devices, and/or on a single processor under an operating system capable of multi-thread processing. In other embodiments, other partitions among processors or threads may be used as desired.

In some embodiments, one or more of the images may be omitted from the sequence. For example, it may be the case that an image is so dissimilar from the other images that none of the transition effects are particularly suitable for use in transitioning to or from this image. Such images may be considered "outliers" and may be removed from consideration, e.g., in the interest of the overall aesthetic of the sequence.

Embodiments

Figure 5:
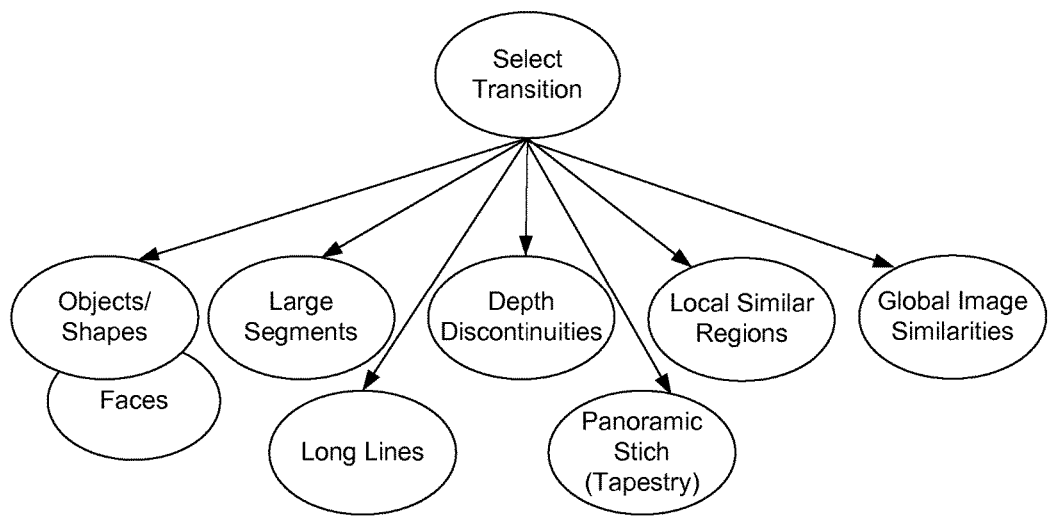
FIG. 5 illustrates a set of exemplary transition effects, according to one embodiment.

The following describes various embodiments of the above method that include specific examples of transition effects implementing transitions between images. More specifically, exemplary transition effects contemplated for use in embodiments of the method of FIG. 3 are described and illustrated in corresponding figures. FIG. 5 illustrates a set of exemplary transition effects from which the method may select in determining the image sequence. As FIG. 5 shows, in this exemplary embodiment, the transition effects include an object based transition effect (including faces), a large segment based transition effect (e.g., using large color fields), a long line or edge based transition effect (e.g., vertical, horizontal, or oblique), a depth discontinuity (e.g., foreground/background boundaries) based transition effect, a panoramic stitch (tapestry) based transition effect, a local similar regions based transition effect, and a global image based transition effect. Note, however, that any other types of transition effects using any type of image operations may be used as desired. Note also that the particular sequence of operations described in the below examples are meant to be exemplary only, and are not intended to limit the transition effects and image operations to any particular sequencing, arrangement, number, or type.

Object Based Transition Effect

Figure 6:
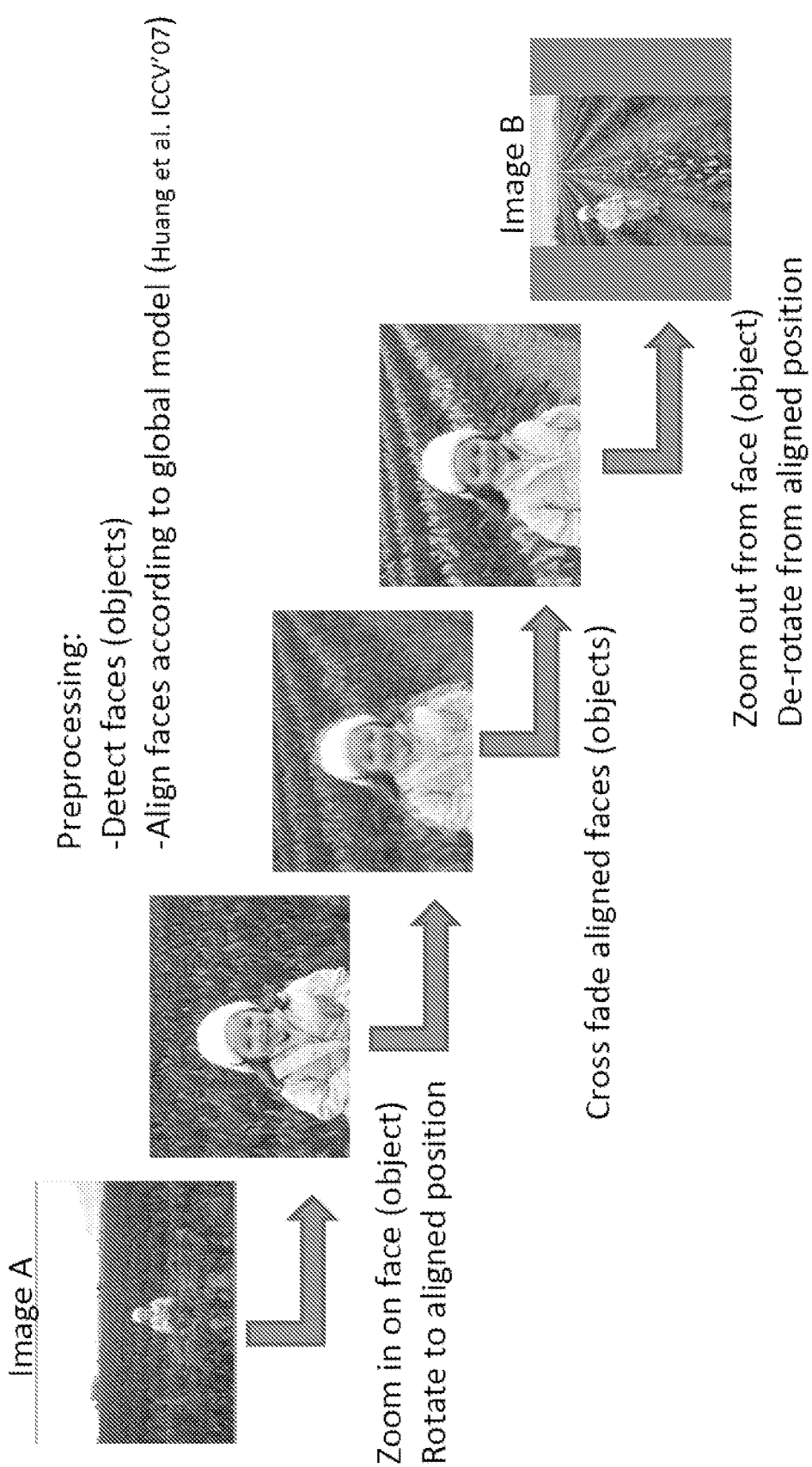
FIG. 6 illustrates an exemplary object based transition, according to one embodiment.

As mentioned above, in one embodiment, the transition effects may include image operations for transitioning between similar objects, e.g., faces. FIG. 6 illustrates an exemplary transition using this approach, where a first image, image A, is transitioned to a second image, image B. As may be seen, each of these images includes a child's face, where in this particular case, the child is the same in both images, although in other cases, this need not be the case.

First, e.g., in a pre-process, image metadata, may be extracted for each image in the set of images, e.g., via the analysis of 302 described above with reference to FIG. 3. Extracting the metadata may include detecting faces (or other objects such as cars, people, or basic shapes such as circles, rectangles, triangles, and so forth, e.g., as specified) in all images. Note that any techniques for detecting such objects may be used as desired. For example, basic shapes can be detected using techniques disclosed in Ferrari et al. PAMI '08 and Shechtman et al, CVPR '07, among others. Faces can be detected via any of various techniques, such as those disclosed in P. Viola and M. Jones, Robust Real-time Face detection, International Journal of Computer Vision (IJCV) 57(2) 137-154, 2004 (Originally presented in CVPR '01), among others. Other techniques for object defection may be found in Bourdev & Brandt, Robust Object Detection via Soft Cascade, CVPR '05.

Any faces (or other objects) detected may then be aligned, e.g., using a global model as described in Huang et al. ICCV '07. A descriptor vector (e.g., filter responses) may then be determined or extracted for each aligned face (or object). A transition score may then be computed for each pair of images (as discussed above), e.g., with respect to each transition effect, where, in the case of images with faces, the transition scores may be computed based on the descriptor vectors, i.e., based on the face descriptor vectors similarity. For example, in one embodiment, an image patch may be extracted from each aligned image, and fibers applied to the patches to determine their similarity.

Assuming that this transition effect is selected for use in the sequence, during presentation of the sequence, a transition based on this transition effect may be performed as described below with reference to FIG. 6. Following the sequence of images of FIG. 6 from top left to bottom right (although the transition may also be performed in the reverse direction), the transition begins with image A (first image), which includes a child in a field of flowers, then zooms in on the child's face (second image). Note that if the face were aligned previously (e.g., as part of a preprocess), then the image may also be rotated to bring the face into alignment, e.g., before, during, or after the zoom operation. A cross fade to the face in image B may be performed, e.g., either toward the end of the zooming/rotation, or possibly at the end (third and fourth images), after which a zoom out may be performed to reveal image B as a whole (fifth/last image). Note that if alignment of the face in image B were performed, then the cross fade to (zoomed) image B may actually be a rotated version, thus, in addition to the zoom out of image B, a rotation (or de-rotation) may also be performed to return the image from its aligned orientation to its original orientation, as well as a shift to center the image. Note that if the faces (objects) occupy different relative positions in their respective images, the zooms (in and out) may also include translations or shifts, as well as rotations.

Large Segment Based Transition

Figure 7:
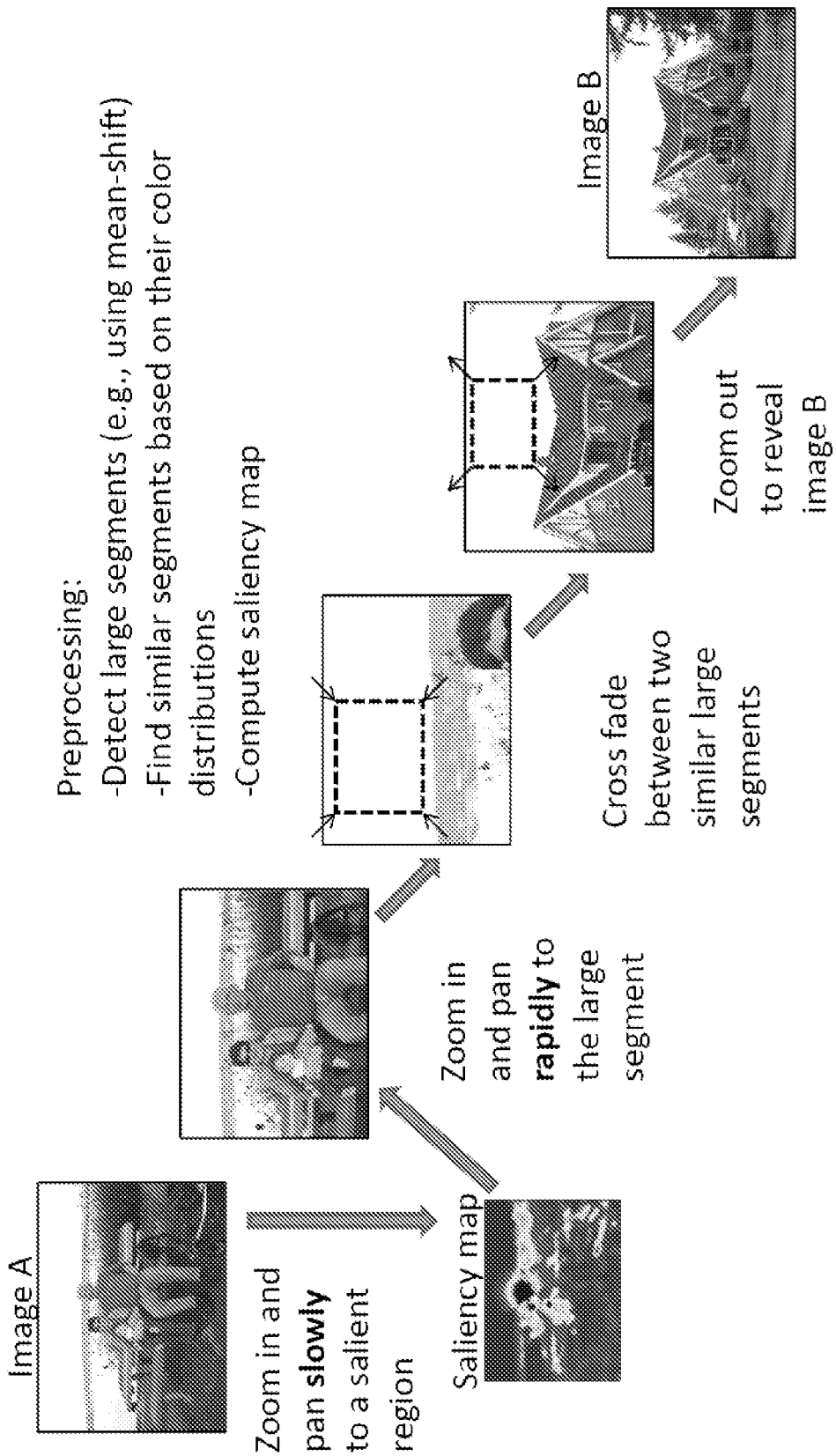
FIG. 7 illustrates an exemplary large segment based transition, according to one embodiment.

As noted above, in one embodiment, the transition effects may include image operations for transitioning between large image segments (e.g., color fields), e.g., large expanses of color in the images. FIG. 7 illustrates an exemplary transition using this approach, where a first image, image A, is transitioned to a second image, image B, using large segments of "sky" in each image, although any other large segments may be used as desired.

In this exemplary embodiment, analyzing the images to extract image metadata may include computing segmentation of the image, e.g., using mean-shift on pixel colors or any other segmentation method, to determine (large color based) segments in each of the images. A search for a segment above some threshold in size may then be performed.

A transition score may then be calculated for pairs of images (with respect to this transition effect) by computing the similarity of color distributions (represented by the transition scores) of pairs of large segments from the respective pairs of images. For example, in one embodiment, an expected (similarity-based) "distance" between two fuzzy objects (the large segments) may be characterized by a Gaussian function, e.g., based on mean color and a covariance matrix. In other words, once large segments are found in the respective image pairs, the color distributions (e.g., color models) of the segments may be compared to compute respective transition scores and determine similar pairs from the images. Said another way, after the large segments have been identified, similar large segments may be found based on their color distributions, by computing and comparing transition scores for the segment pairs (corresponding to image pairs).

In some embodiments, a salience map for each image for a subset of the images) may be determined, e.g., for use in performing "interesting" pans over the image.

Then, assuming that this transition effect is selected for use in the sequence, during presentation of the sequence, a transition based on this transition effect may be performed as described below with reference to FIG. 7. As with FIG. 6, following the sequence of images of FIG. 7 from top left to bottom right (although, as noted above, the transition may also be performed in the reverse direction), the transition begins with image A (first image), which includes a family setting on a bench outdoors. A (preferably slow) zoom and pan may be performed (sequentially or concurrently) to a salient region, e.g., to an interesting or complex portion of the image, using the saliency map for the image, e.g., to the family in image A, as shown in the second image. Then, a zoom and pan may be rapidly made to a large segment in the image, in this case, the sky, indicated by the dashed line rectangle in the third image. A cross fade to a large segment in image B may be performed, e.g., at or toward the end of the zoom (third and fourth images), after which a zoom out may be performed to show the entirety of image B (fifth/last image). Described a slightly different way, the transition effect may include: zooming and panning slowly in on a salient object in image A, zooming in rapidly into the large segment of image A, cross fading into a large segment of image B, zooming out rapidly into a salient object in image B, then panning and zooming slowly to the center of image B.

Long Edge Based Transition

Figure 8:
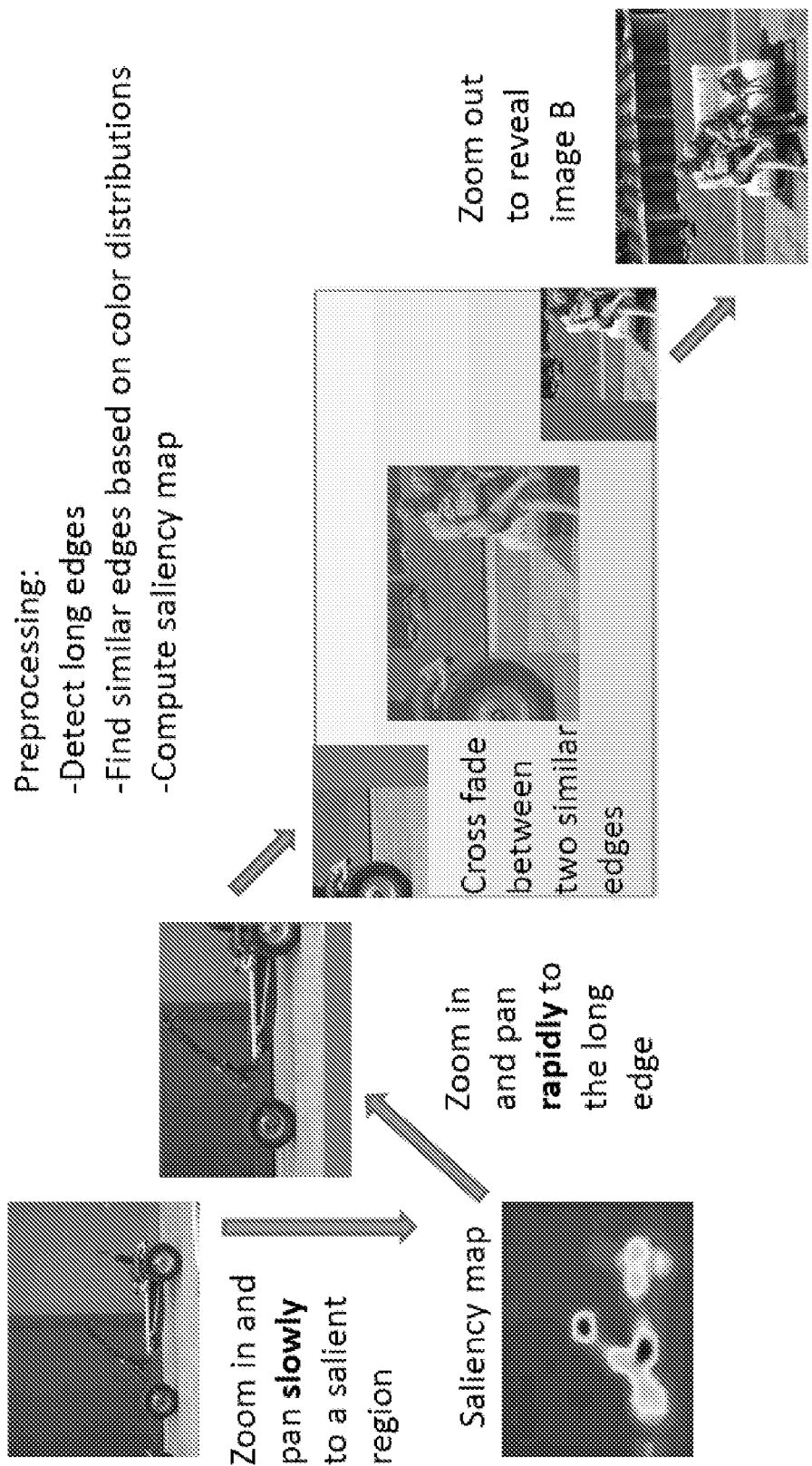
FIG. 8 illustrates an exemplary long edge based transition, according to one embodiment.

In one embodiment, the transition effects may include image operations for transitioning between long lines or edges in the images. FIG. 8 illustrates an exemplary transition using this approach, where a first image, image A, is transitioned to a second image, image B, using long lines or edges in each image.

In this exemplary embodiment, analyzing the images to extract image metadata may include detecting long edges or lines in each of the images, e.g., using edge detection algorithms, and searching for lines or edges above some threshold in length. Similar long edges may be determined (found) based on color distributions. For example, a transition score for this transition effect may be calculated for pairs of images by computing the similarity of color distortions (represented by the transition scores) of pairs of edges from the respective pairs of images, and these scores used to find similar edges in image pairs. As with the segment based transitions, in some embodiments, a salience map for each image (or a subset of the images) may be determined, e.g., for use in performing "interesting" pairs over the image.

Assuming that this transition effect is selected for use in the sequence, during presentation of the sequence, a transition using this transition effect may be performed as described below with reference to FIG. 8. As with FIGS. 6 and 7, following the sequence of images of FIG. 8 from top left to bottom right, the transition begins with image A (first image), which includes a go-cart on gray concrete in front of a bi-colored wall. A (preferably slow) zoom and pan may be performed (sequentially or concurrently) to a salient region, e.g., to an interesting or complex portion of the image, using the saliency map for the image, e.g., to the go-cart in image A, as shown in the second image. Then, a zoom and pan may be rapidly made to a long edge in the image, in this case, the edge between the right portion of the wall and the concrete just behind the go-cart, indicated by the first (top left) inset in the third image. A cross fade to a long edge in a (zoomed) portion image B may be performed, as indicated in the second (middle) and third (bottom right) insets of the third image, after which a zoom out may be performed to show the entirety of image B (fourth/last image).

Depth Discontinuity Based Transition

Figure 9:
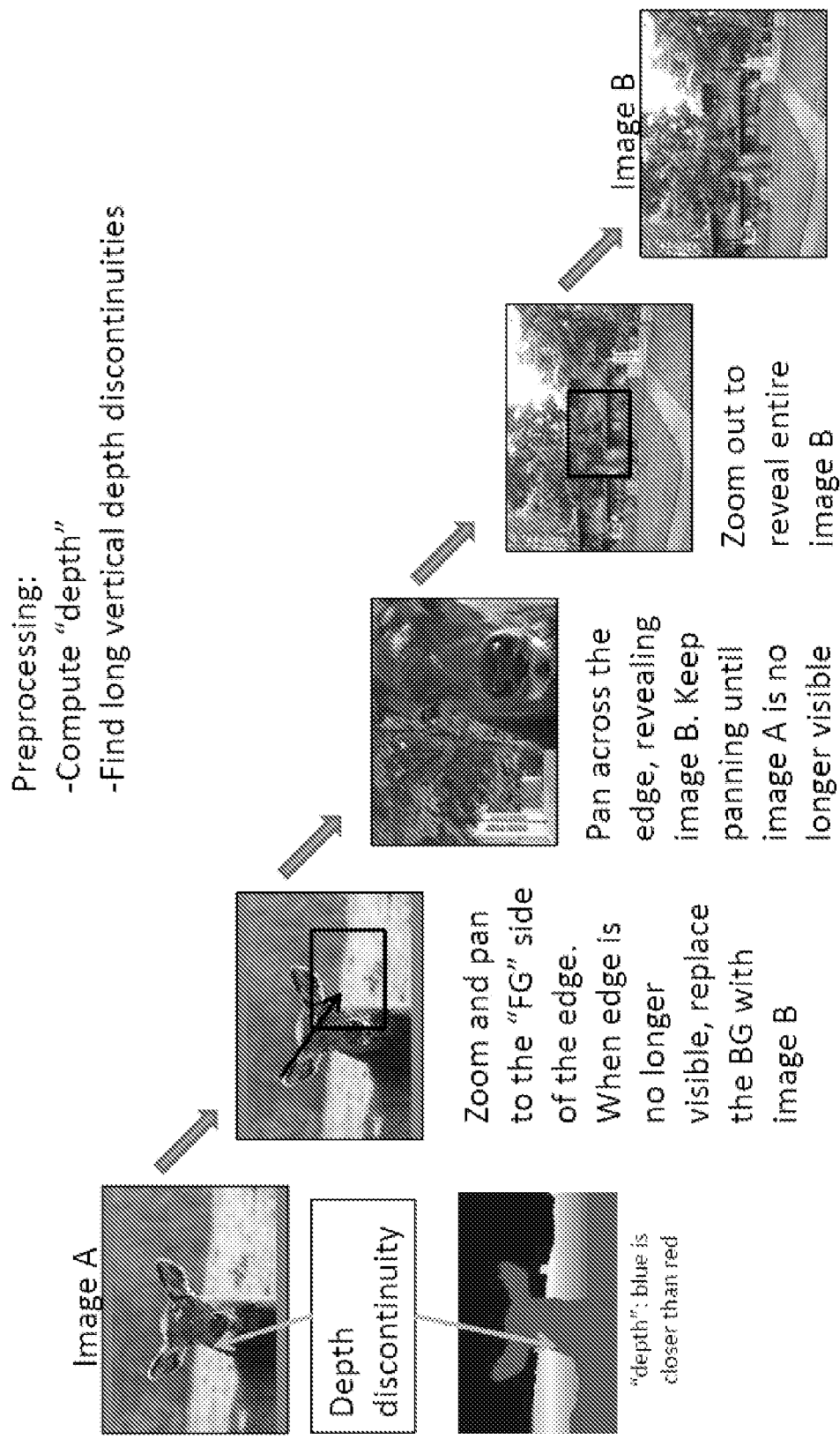
FIG. 9 illustrates an exemplary depth discontinuity based transition, according to one embodiment.

In one embodiment, the transition effects may include image operations for transitions based on depth discontinuities in the images. FIG. 9 illustrates an exemplary transition using this approach, where a first image, image A, is transitioned to a second image, image B, using depth discontinuities in each image.

In this exemplary embodiment, analyzing the images to extract image metadata may include computing depth (e.g., approximate foreground and background planes) for each of the images, (e.g., using the algorithm disclosed in "Photo Pop-up", Hoiem and Efros, SIGGRAPH '2005, or any other depth computation algorithm desired), and searching for long vertical (or possibly horizontal or oblique) depth discontinuities. For example, a depth map for each image may be computed, and a search may be performed for long edges in the depth map (e.g., vertical, or otherwise), where each edge has a near or foreground side, referred to the FG side for convenience, and a far or background side, referred to as the BG side for convenience, where the FG side is "closer" to the viewer or camera than the BG side. In some embodiments, FG and BG color models or distributions may also be used.

Transition scores for this transition effect may then be computed based on these debated edges. In one embodiment, local colors may be matched across the depth edge (or any other image demarcation) between image pairs, where the BG side of a first image is matched to a region, e.g., a BG region, in a second image. For example, in one embodiment, (as part of the metadata extraction process) each image may be divided into a coarse grid of pixel squares (e.g., 8×12 pixels), and a color histogram computed for each square, referred to as local color histograms. The images may be roughly aligned based on these local color histograms, e.g., by (computationally) sliding the coarse grid of image B over that of image A and analyzing the differences between the color histograms of the overlapping regions. The alignment that minimizes the difference in colors may then be determined, and the transition score computed based on the best alignment color similarity. In other embodiments, other techniques for aligning and/or matching may be used as desired, e.g., using edge orientation histograms, etc. For example, while in some embodiments, only colors are matched across the images, in other embodiments, other information may be extracted from the images and used to match or align image regions, e.g., foreground/background separations, plane orientations, etc., which may make the transitions even more natural, e.g., background to background transitions, floor plane to floor plain transitions, ceiling/sky transitions to a similar ceiling/sky, and so forth.

Assuming that this (or a similar) transition effect is selected for use in the sequence, in one embodiment, during presentation of the sequence a transition using this transition effect may be performed as described below with reference to FIG. 9. In the embodiment shown, the transition begins with image A (first image, top left), which includes a deer in a field. Note that in this case, the depth edge (depth discontinuity) is along the left vertical edge of the deer's head and neck, as shown in the first image (image A), as determined by the depth map shown just below. A (preferably slow) zoom and pan may be performed to the FG side of the depth edge of image A, as indicated by the rectangular region shown in the second image, such that the depth edge is no longer visible. When the edge is no longer visible, the background (of image A) to the left of the depth edge may be replaced with a portion of image B (which isn't immediately visible), e.g., based on color histogram similarity. Then, a pan back across the depth edge may be performed, revealing this portion of image B, as illustrated in the third image. Note that at this stage, the FG object of image A occupies one portion of the visible screen image, while the portion of image B occupies the remainder of the visible screen image. This pan may be continued until image A cannot be seen, i.e., the FG object of image A is no longer visible, as shown in the fourth image, specifically, that portion indicated by the rectangular region. A zoom out may then be performed to reveal the entirety of image B (fifth/last image).

Described a slightly different way, the transition effect may include: zooming in and panning slowly on a salient object on image A's FG side (of the depth edge), so that the depth edge is not visible on screen, replacing the BG side of the edge with a portion of image B, e.g., image B's BG side, panning from image A FG side to the portion of image B, e.g., the BG side across the edge, panning away from the depth edge in image B to a salient object in B, so that the depth edge is not visible on screen, and zooming out to reveal the entire image B. Note that when salient objects are used, the metadata extraction process may include computing a saliency map.

Panoramic Stitching Based Transition

Figure 10:
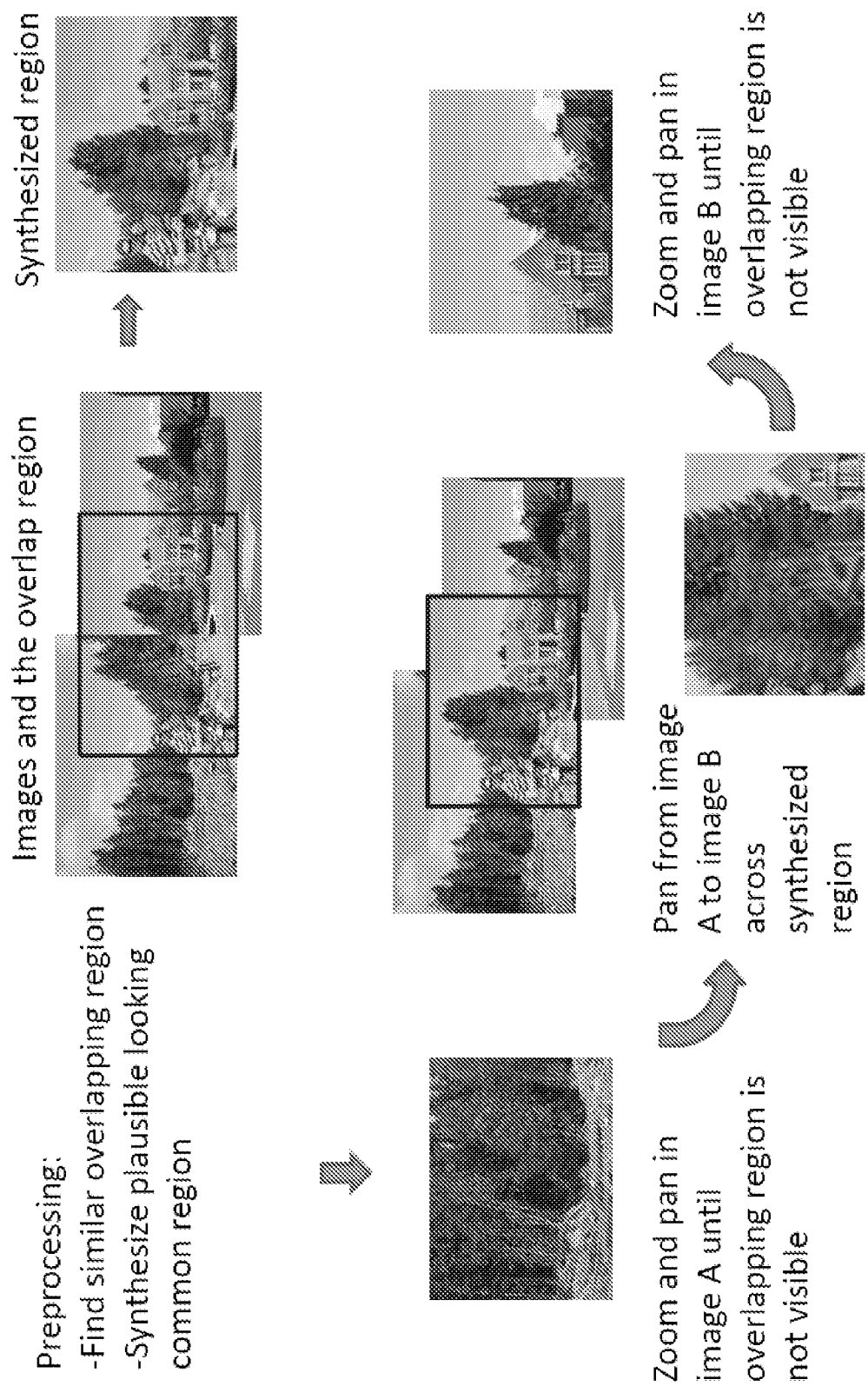
FIG. 10 illustrates an exemplary panoramic stitch based transition, according to one embodiment.

In one embodiment, the transition effects may include image operations for transitions based on panoramic stitching. FIG. 10 illustrates an exemplary transition using this approach, where a first image, image A, is transitioned to a second image, image B, using panoramic stitching.

In this exemplary embodiment, and similar to the depth discontinuity approach described above with reference to FIG. 9, analyzing the images to extract image metadata may include dividing each image into a coarse grid of pixel squares (e.g., 8×12 pixels), and computing a metric, e.g., a color histogram, for each square, referred to as local metrics, e.g., local color histograms. The images may be roughly aligned based on these local metrics. For example, when using local color histograms, the images may be roughly aligned by (computationally) sliding the coarse grid of image B over that of image A and analyzing the differences between the color histograms of the overlapping regions. The alignment that minimizes the difference in colors may then be determined, and the transition score computed based on the best alignment color similarity. As part of the pre-processing analysis stage, similar overlapping regions in image pairs may be determined (e.g., based on the transition scores), and a plausible looking common region synthesized for use in the transition, described below. This synthesis is illustrated in the top two images of FIG. 10, where an image A and image B are shown conjoined with an indicated overlap region of two images (left images, top), and a resulting synthesized region (right top image) is displayed. Note that the synthesized region may include elements or portions of both images, but may be processed to smooth or soften/blur the boundary or edge between them.

Assuming that this transition effect is selected for use in the sequence, during presentation of the sequence, a transition using this transition effect may be performed as described below with reference to FIG. 10. In this exemplary embodiment, the transition begins with image A (first image, top left), which includes a man holding a child in a wilderness area. A (preferably slow) zoom and pan may be performed in image A until the overlap region of image A is not visible, as indicated by the left middle image—note that the man and child are no longer visible. Then, a pan may be performed from image A to image B across the synthesized region, as illustrated in the middle, where the synthesized region is shown in the context of conjoined images A and B, and in the bottom image, which emphasizes the synthesized region. Note that at this stage, the visible screen shows portions of both image A and image B, conjoined by the synthesized (overlap) region. This pan may be continued until image A and the overlap region cannot be seen, i.e., until only the portion of image B that is not part of the overlap region is visible, as shown in the right middle image. A zoom out may then be performed to reveal the entirety of image B (right portion of top middle image, i.e., image B).

Described a slightly different way, in one embodiment, bidirectional similarity (e.g., as disclosed in Simakov et al., CVPR '08) may be used to synthesize a new overlapping region depicting smooth and gradual transition across the boundaries of image A and image B. In other embodiments, other methods may be used, such as stitching in the gradient domain (as disclosed Sivic et al., CVPR '08). Note that in the present technique, rather than using global similarities, similarities between local boundary regions may be used (e.g., by dividing the image into small rectangles), thus allowing the effect to be used for many more images and for smaller collections, which may be more practical for smaller (e.g., private) collections of images. Note also that the use of bi-directional similarity techniques facilitates stitching of less similar regions, whereas gradient domain stitching generally requires that stitched regions be more similar. Of course, other similarity metrics and stitching techniques may be used as desired.

In one embodiment, the transition effect may include using an overlapping similar region, for the transition by panning across it, starting in image A and ending in image B, where, as described above, the overlapping regions in both images have been replaced with the synthetic region such that its boundaries are similar to the adjacent content. A slow zoom and pan on a salient object in image A may be performed until the overlapping region is not visible on the screen, then a pan from image A to image B may be performed using the synthesized overlapping area, after which a zoom out may be performed to reveal the entire image B.

Local Similar Regions Based Transitions

In one embodiment, the transition effects may include image operations for transitions based on local similar regions in two images. For example, two images may have the same backgrounds (e.g., where the images were captured at the same place), or may contain the same repeating objects (e.g., a particular car, logo on a t-shirt, etc.), where the images were acquired or captured under different viewing directions, different lighting conditions, and/or at different times.

Various methods exist for automatically finding such similarities between images, and work quite well assuming the objects/places/logos include sufficient detail. For example, in one embodiment, the similar regions including objects, logos, etc.) may be determined by extracting feature points in the pair of images (e.g., via SIFT (scale invariant feature transform) or similar techniques), then determining feature correspondences across the regions (e.g., using a kd-tree or a kmeans-tree, among others), and filtering the correspondences using geometrical constraints, such as, for example, a constraint that the points have to lie on a physical 3D rigid object, on a plane, and so forth) using robust methods such as RANSAC (Random Sample Consensus).

In one embodiment, the common region may be detected or specified as the region (e.g., bounding box) that contains most of the corresponding features, and the transition may be similar to that described above with respect to objects/faces, e.g., zoom-in, rotate, cross-fade, zoom-out.

Global Image Similarity Based Transitions

In one embodiment, the transition effects may include image operations for transitions based on global similarity between images. In other words, rather than focusing on local regions or objects in the images that are similar, the transition effect may be based on global properties of the images. Thus, in these embodiments, the metadata extracted for the images may include common global image descriptors, such as, for example, color histograms, GIST descriptors, and bag-of-features representations, among others.

The transition effects may be or include a simple cross-fade of the entire image. In other words, when two images have global similarities, the transition effect may utilize the entirety of each image as opposed to some local region. In other words, one or both of the images may be faded to or from in its entirety, rather than some "zoomed in" region. Thus, in some embodiments, the region determined in 304 above may be the entire image.

In some embodiments, the order of the sequence of images may be fixed, e.g., may be pre-determined, e.g., by a user, in which case various of the above techniques may be used to determine appropriate (e.g., interesting and/or aesthetically pleasing) transitions between each successive pair of images. In other words, embodiments of any of the above method elements except the image ordering operations may be applied to fixed image sequences.

Moreover, it should be noted that in further embodiments, the above techniques may be used with respect to video sequences, e.g., stitching video clips (e.g., for home video editing), transitioning between scenes, etc. In other words, in some embodiments, transitions between video images may be determined based on the video image contents, per embodiments of the systems and method described herein.

Thus, various embodiments of the systems and methods disclosed herein may be used to determine transition effects implementing or facilitating transitions between images in a sequence based on the content of the images.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A method comprising:
   measuring at least one image characteristic of multiple images by analyzing content of the multiple images;
   determining a sequence of the images in which each pair of consecutive images in the sequence has a similar region of the content according to the measured image characteristic; and
   applying a transition effect for the pair of consecutive images to transition from a display of a first image of the pair to a display of a second image of the pair, the transition effect usable to implement a face-based transition effect between the pair of images when the similar region of content includes a face according to the measured image characteristic, the face-based transition effect applied to align the first image and the second image.

2. The method of claim 1, wherein the transition effect includes shifting the display of the first image to align the similar region of the first image and the second image during the transition effect.

3. The method of claim 1, wherein the transition effect includes shifting the display of the second image to align the similar region of the first image and the second image during the transition effect.

4. The method of claim 1, wherein the transition effect includes performing a morphing technique to one of cross fade or transition between the similar region of the first image and the second image.

5. The method of claim 1, wherein the transition effect includes at least one of translating, scaling, or rotating the display of the first image to align the similar region of the first image and the second image during the transition effect.

6. The method of claim 1, wherein the transition effect includes at least one of translating, scaling, or rotating the display of the second image to align the similar region of the first image and the second image during the transition effect.

7. The method of claim 1, further comprising detecting the similar region for the pair of consecutive images based on the measured image characteristic.

8. The method of claim 7, wherein the transition effect is usable to implement a depth-discontinuity transition effect when the similar region detected in the first image and the second image corresponds to depth discontinuities, the depth-discontinuity transition effect determined based on:
   computing a depth map for each of the multiple images based on the measuring;
   searching the depth maps for the depth discontinuities; and
   aligning the similar region of the first image and the second image using the depth discontinuities found in the first image and the second image as a result of the searching.

9. The method of claim 7, wherein the transition effect is further usable to implement:
   an object-based transition effect when the similar region detected in the pairs of images corresponds to one or more objects;
   a large segment transition effect when the similar region detected in the pairs of images corresponds to one or more regions that are considered large segments of the images;
   a panoramic stitch transition effect when the similar region detected in the pairs of images corresponds to one or more regions that can be stitched together to form a panoramic image; or
   a local similar regions transition effect when the similar region detected in the pairs of images corresponds to similar backgrounds, similar objects, or similar logos.

10. One or more computer-readable memory devices storing instructions thereon that are executable by a computing device to perform operations comprising:
    measuring at least one image characteristic of at least two images by analyzing image content of the at least two images;
    detecting faces that are similar in the image content of the at least two images according to the measured image characteristic; and
    applying a face-based transition effect for a transition from a display of a first one of the images to a display of a second one of the images, the face-based transition effect applied effective to align, during the transition, similar faces detected in the at least two images.

11. The one or more computer-readable memory devices of claim 10, wherein the transition effect includes at least one of translating, scaling, or rotating the display of the first image to align the similar faces of the first image and the second image during the transition effect.

12. The one or more computer-readable memory devices of claim 10, wherein the transition effect includes at least one of translating, scaling, or rotating the display of the second image to align the similar faces of the first image and the second image during the transition effect.

13. The one or more computer-readable memory devices of claim 10, wherein said measuring the at least one image characteristic is performed for more than two images to determine a sequence of the images in which each pair of consecutive images in the sequence has a similar region of the image content according to the measured image characteristic.

14. The one or more computer-readable memory devices of claim 13, wherein the operations further comprise applying a transition effect for each of the pairs of consecutive images based on the similar region detected for each of the pairs, the transition effect comprising:
    a face-based transition effect when the similar region detected for the pair corresponds to one or more faces;

an object-based transition effect when the similar region detected for the pair corresponds to one or more objects;

a large segment transition effect when the similar region detected for the pair corresponds to one or more regions that are considered large segments of the images;

a depth discontinuity transition effect when the similar region detected for the pair corresponds to one or more depth discontinuities;

a panoramic stitch transition effect when the similar region detected for the pair corresponds to one or more regions that can be stitched together to form a panoramic image; or a local similar regions transition effect when the similar region detected for the pair corresponds to similar backgrounds, similar objects, or similar logos.

15. The one or more computer-readable memory devices of claim 10, wherein the face-based transition effect includes shifting the display of the first image to align the similar face of the first image and the second image during the face-based transition effect.

16. The one or more computer-readable memory devices of claim 10, wherein the face-based transition effect includes shifting the display of the second image to align the similar face of the first image and the second image during the face-based transition effect.

17. A system comprising:
a display device configured to display images and transition effects that transition from one of the images to another of the images;
a memory and at least one processor to implement an image analysis module configured to:
measure at least one image characteristic of the images by analyzing content of the images;
determine a sequence of the images in which each pair of consecutive images in the sequence has a similar region of the content according to the measured image characteristic; and
apply a transition effect for each of the pairs of consecutive images to transition from a display of a first image of the pair to a display of a second image of the pair, the transition effect usable to implement a face-based transition between the pair of images when the pair of images have similar faces in the content according to the measured image characteristic, the face-based transition effect applied to align the similar faces of the first and second images.

18. The system of claim 17, wherein to determine the transition effects for each of the pairs of images, the image analysis module is further configured to:
determine a transition score for each of the pairs of images with respect to multiple candidate transition effects that can be applied to the pair to transition from the first image of the pair of images to the second image of the pair of images, wherein the transition score represents suitability of a candidate transition effect to transition between the first image of the pair of images and the second image of the pair of images; and
determine transition effects between the consecutive images for the sequence of the images based on the transition scores.

19. The system of claim 18, wherein to determine the transition effects between consecutive images for the sequence of the images based on the transition scores, the image analysis module is further configured to:
solve an optimization problem to determine a solution that substantially maximizes similarity over the sequence of images.

20. The system of claim 19, wherein the optimization problem is solved subject to one or more constraints, wherein the one or more constraints are specified with respect to one or more of:
priorities or preferences with respect to image attributes;
repetition or frequency of image attributes;
priorities or preferences regarding the candidate transition effects;
repetition or frequency of the transition effects; or
distribution of image content.

* * * * *